Jan. 8, 1935.                C. E. BENNETT                1,986,789
       ELECTRIC POWER CABLE SYSTEM FOR THE UNDERGROUND
                TRANSMISSION OF ELECTRICAL ENERGY
                       Filed July 19, 1933
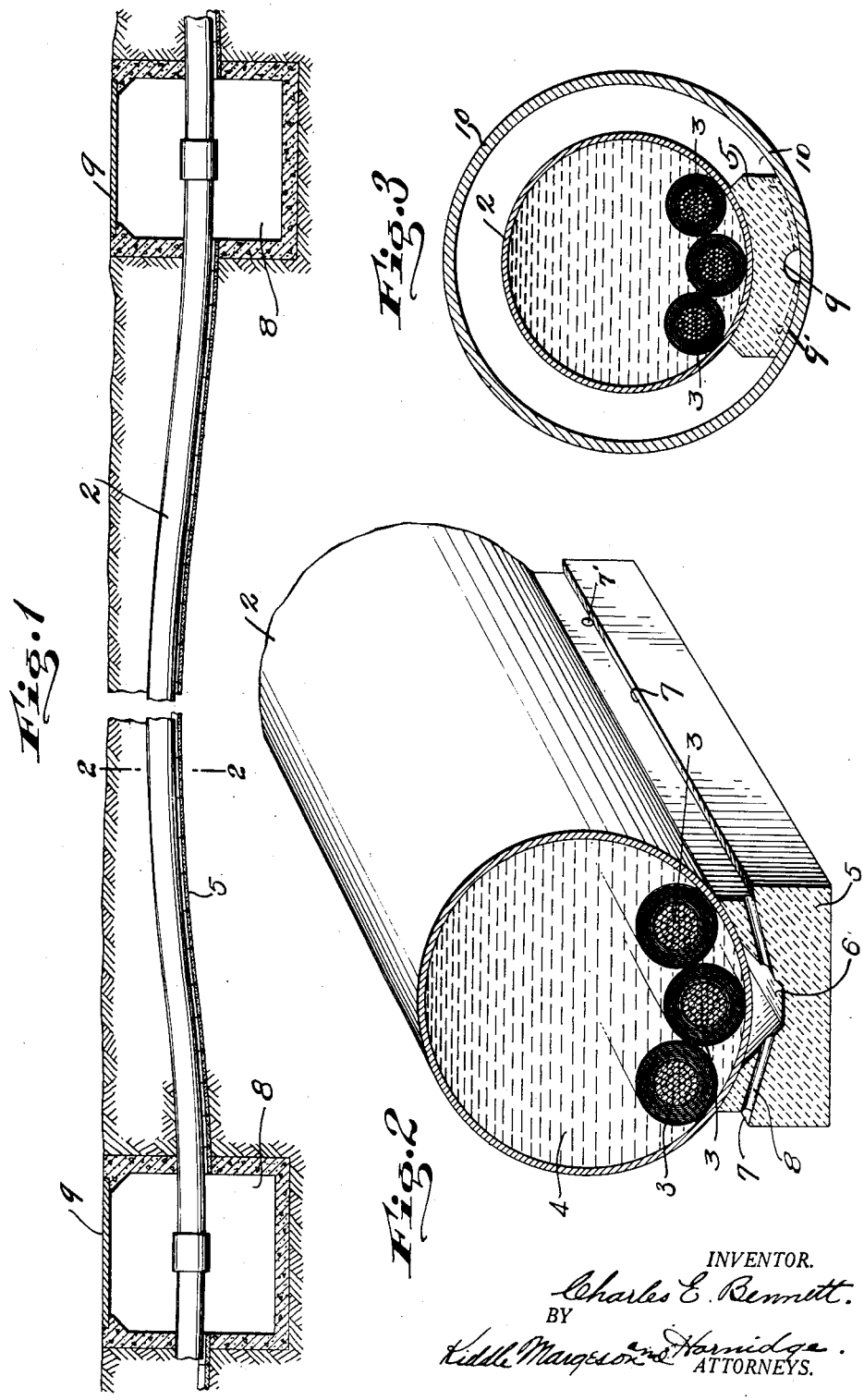
INVENTOR.
Charles E. Bennett.
BY
Kiddle Margeson and Harnidge
                           ATTORNEYS.

Patented Jan. 8, 1935

1,986,789

UNITED STATES PATENT OFFICE 1,986,789

ELECTRIC POWER CABLE SYSTEM FOR THE UNDERGROUND TRANSMISSION OF ELECTRICAL ENERGY

Charles E. Bennett, Hawthorne, N. J., assignor to The Okonite-Callender Cable Company, Incorporated, Paterson, N. J., a corporation of New Jersey Application July 19, 1933, Serial No. 681,143

6 Claims. (Cl. 247—3)

This invention relates to an improvement in electric cable systems for the underground transmission of electrical energy and is more specifically directed to an improvement in electric cable systems in which the insulated unsheathed conductors of the cable are submerged in oil under pressure contained in a pipe line as disclosed in my copending application Serial No. 553,714, filed July 29, 1931.

One of the objects of the present invention is the provision in such a system of an inexpensive construction which will enable a leak in the pipe line to be quickly located.

In accordance with the present invention I propose to lay the pipe line on tile or some other suitable material providing a continuous gutter beneath the pipe line and leading to manhole equipped sumps provided at low points in the system, whereby the oil, in the event of a leak in the line, will flow along the gutter and collect in the nearest sump, the presence of oil in a sump indicating that there is a leak in the line between that sump and the adjacent elevated part of the system.

In the drawing accompanying this application:

Fig. 1 is a sectional elevational view of a cable system embodying my invention;

Fig. 2 is a section on the line 2—2 of Fig. 1; and

Fig. 3 is a modification.

Referring to the drawing in detail and first of all to Figs. 1 and 2, the unsheathed conductors 3 of a multi-conductor cable are laid in a pipe line 2 which is filled with liquid insulation 4 such as oil under high pressure, as will be understood.

Inasmuch as this cable system as so far described constitutes the subject matter of my copending application above referred to it is unnecessary to describe the system in any more detail.

The pipe line 2 is laid on undulating tile 5 or other suitable oil-impervious relatively inexpensive material providing a continuous gutter or channel 6 below the pipe 2.

As indicated above I propose to provide sumps 8 at the various low points of the line or system for collecting any oil escaping from the pipe line 2 and which will flow by gravity along the undulating longitudinal gutters 6 and 7.

The sumps are located in manholes 8, provided with covers 9 so that they may be inspected regularly, the presence of oil in any one of these sumps indicating that a leak exists in the pipe line 2 in the length between the sump and the adjacent high point of the line at one side or the other of the sump. If the pipe line is installed in a level trench I propose to slope or incline it slightly to provide an undulating structure.

The sides of the tile 5 are cut back as shown in Fig. 2 to provide the gutters 7, and at intervals holes 7' are bored through the tile into the central gutter 6 so that any escaping oil flowing down the sides of the pipe line 2 will seep into the central gutter.

While I have specifically described an embodiment of my invention in which I employ a pipe line filled with oil in which the unsheathed conductors are laid it is to be understood that the invention is also applicable to other types of oil filled cable systems, the invention in this connection being realized by laying such a cable on tile or other suitable material shaped to provide a gutter for receiving the liquid insulation leaking out of the cable and to conduct the same by gravity to a suitable sump at a low part of the line.

In the embodiment of my invention as illustrated in Fig. 3 the oil filled pipe line 2 in which the unsheathed cable conductors 3 are laid rests on tile 5 as before, enclosed in a pipe 10 the tile being suitably channeled at 9 and 9' for conducting the leaking oil to sumps as described in connection with Figs. 1 and 2. This construction is well adapted for street crossings, for example.

What I claim is:—

1. A cable system comprising an oil filled cable system, an undulating gutter structure extending longitudinally of the system beneath the same and on which the cable rests for receiving oil escaping from the cable, and sumps at the low points of the gutter structure for the collection of oil from said gutter.

2. A cable system comprising an oil filled cable system laid on a supporting undulating structure providing an undulating central gutter extending beneath the cable longitudinally of the same, said structure being provided with longitudinally extending side channels communicating with the central gutter, said gutter and side channels receiving oil escaping from the cable system, and sumps at the low points in the said undulating supporting structure for the collection of oil from said gutter.

3. A cable system comprising in combination an oil filled pipe line containing unsheathed but insulated cable conductors submerged in said oil, an undulating oil-impervious gutter structure beneath the pipe line for receiving oil escaping from the pipe line, and sumps at the low part of the undulating gutter structure for collecting oil from the gutter.

4. An electric power cable system comprising in combination a buried oil filled pipe line containing unsheathed paper insulated cable conductors submerged in the oil in the pipe line, an oil-impervious gutter structure beneath the pipe line for receiving oil escaping from the pipe line, said pipe line and gutter structure having an undulating profile, sumps at the low points of the system for collecting the oil from the gutter structure, said sumps being accessible from above ground.

5. An electric power cable system comprising in combination a buried pipe line containing unsheathed paper insulated cable conductors, oil under high pressure filling the space in the pipe line unoccupied by the cable conductors and their insulation, an oil impervious structure beneath the pipe line, said structure being provided with a central longitudinal gutter, with longitudinally extending side channels paralleling said gutter and with lateral passages for maintaining communication between the side channels and central gutter, said pipe line and underlying structure having an undulating profile, sumps at the low points in the underlying structure for receiving from the gutter oil escaping from the pipe line, said sumps being accessible from above ground.

6. An electric power cable system comprising in combination a buried pipe line containing unsheathed insulated conductors, oil under high pressure filling the pipe line and in which the conductors and their insulation are submerged, an imperforate pipe line surrounding the first mentioned pipe line and spaced therefrom, a gutter structure beneath the first mentioned pipe line intermediate it and the second mentioned pipe line for receiving oil escaping from the oil filled pipe line, said pipe lines and gutter structure having an undulating contour, and sumps accessible from above ground for collecting the oil escaping from the oil-filled pipe line and flowing by gravity along the gutter structure.

CHARLES E. BENNETT.